United States Patent [19]

Rikuta

[11] 4,234,013
[45] Nov. 18, 1980

[54] CONTROL VALVE FOR KEEPING THE RATE OF FLOW AT A FIXED VALUE

[76] Inventor: Sotokazu Rikuta, No. 24-7, 2-chome, Koun-cho, Maebashi, Gumma, Japan

[21] Appl. No.: 44,739

[22] Filed: Jun. 1, 1979

Related U.S. Application Data

[62] Division of Ser. No. 829,548, Aug. 31, 1977, Pat. No. 4,174,584.

[51] Int. Cl.³ .............................................. F16K 31/12
[52] U.S. Cl. ..................................... 137/504; 137/550
[58] Field of Search ......................................... 137/504

[56] References Cited

U.S. PATENT DOCUMENTS 3,472,275 10/1969 Castro ............................. 137/504 X

*Primary Examiner*—Harold W. Weakley
*Attorney, Agent, or Firm*—Jordan and Hamburg

[57] ABSTRACT

A constant-flow fluid regulating valve includes a valve casing having inlet and outlet ports at opposed ends thereof. A spring is mounted coaxially within the casing between the inlet and outlet ports and interiorly of a slide member that is slidable axially within the valve casing. The spring is adapted to bias the slide member towards the inlet port. An orifice plate having a plurality of apertures is carried by the slide member for movement therewith within the valve casing. A guide member is fixedly and coaxially mounted within the valve casing downstream of the slide member. Circumferential surfaces on the guide member and slide member define together an intermediate flow passage through which the fluid passing through the valve must travel before exiting by means of the outlet port. The spring force tends to offset fluid pressure differentials acting on the opposed surfaces of the orifice plate to thereby maintain the cross-sectional area of the intermediate flow passage substantially constant and consequently also the flow rate of the fluid through the valve.

3 Claims, 2 Drawing Figures

CONTROL VALVE FOR KEEPING THE RATE OF FLOW AT A FIXED VALUE

This is a division of application Ser. No. 829,548, filed Aug. 31, 1977, now U.S. Pat. No. 4,174,584 issued Nov. 17, 1979.

BACKGROUND OF THE INVENTION

The present invention relates to fluid flow regulating valves and more particularly to a flow regulating valve which is adapted to maintain a substantially constant flow rate of fluid therethrough.

DESCRIPTION OF THE PREFERRED EMBODIMENTS

The present invention relates to a fixed flow-rate control valve which always keeps the rate of flow of fluid constant.

Figure 1:
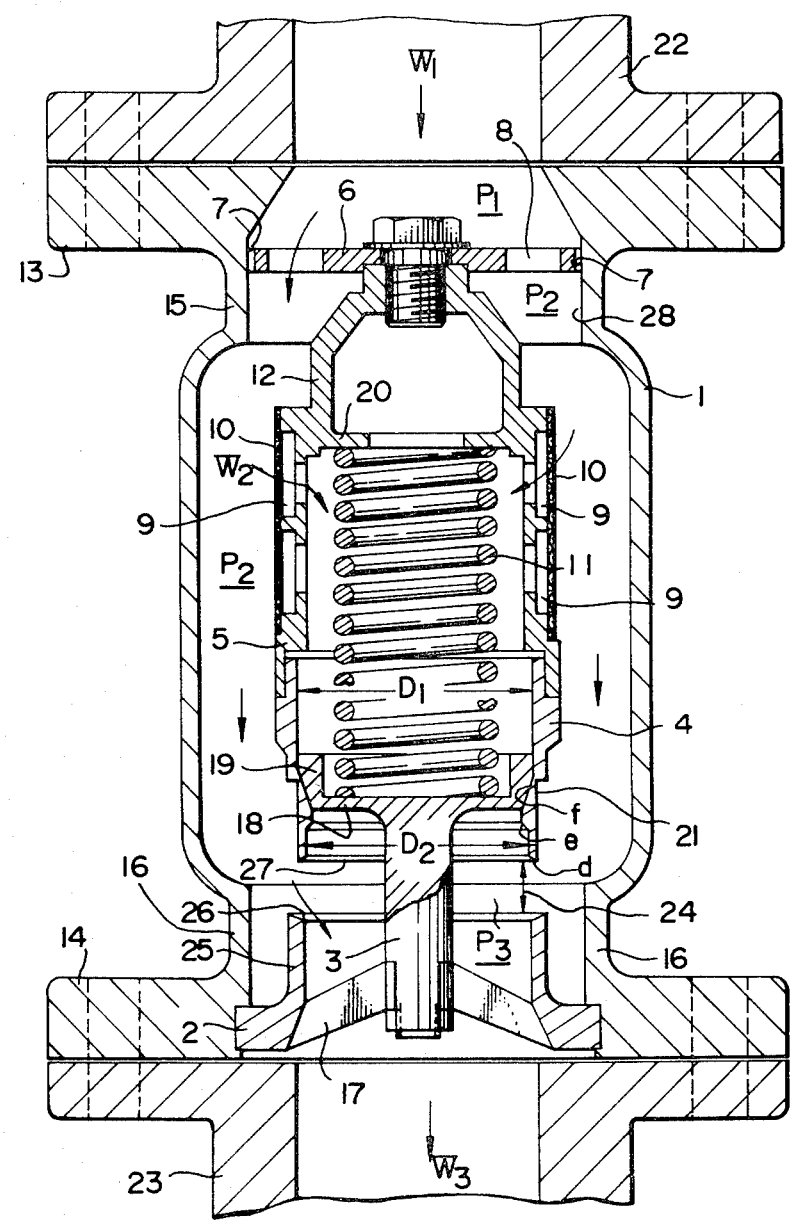
FIG. 1 is a vertical cross-sectional view of a flow control valve according to the invention.

With reference now to FIG. 1 of the drawings, there is illustrated a cylindrical valve casing 1 having at its opposed ends an inlet passage 15 and outlet passage 16 of reduced diameter, and provided with integral flanges 13 and 14 for attachment to inlet and discharge pipes, respectively. The outlet passage 16 houses a guide member 2 which is fixedly mounted in place at its peripheral lower end, to the inner wall of the passage 16. The annular or circumferential upper edge 26 of a tube section 25 of the guide member 2 constitutes a seat to which the annular or circumferential lower edge 27 of a cylindrical valve plug 4 and spaced to form therewith an intermediate flow passage 24 for fluids passing through the valve is opposed.

Furthermore, a centering and support element is provided having its axis common to the valve casing 1 and supported by means of a spider 17 located at the center of the guide member 2. A cup-shaped section 18 having an annular edge 19 surmounts and is integral with the centering and support element. A cylindrical valve plug 4 is positioned about the periphery of edge 19. Its lower part, comprises a tube 21 of reduced outer diameter $D_2$ and its upper part comprises a larger outer-diameter tube of inner diameter $D_1$ equalling the outer diameter $D_2$. The valve plug 4 is loosely mounted on the periphery of the annular edge 19 so as to slide thereon, and a valve cylinder 5 having a plurality of ports 9 in its peripheral wall is firmly fixed on the upper peripheral surface of the cylindrical valve plug 4. The said ports 9 are covered with filtering medium 10 such as wire gauze; an internal flange 20 and a bonnet 12 are integrally mounted on the top of the valve cylinder 5 and a spring 11 is interposed between the internal flange 20 and a section 18 of the centering and support element 3. A circular orifice plate 6 which has flow holes 8 and concave voids 7 in its periphery is attached to the exterior end of the bonnet 12; and the orifice plate 6 is brought into loose contact with inner wall 28 of the inlet passage 15 of valve casing 1, the inner wall serving to guide the orifice plate 6 and to permit it to move. The valve of the present invention is a control valve having the structure as described above and is characterized also in that the inner diameter $D_1$ of the upper, larger outer-diameter tube of the cylindrical valve plug 4 is equal to the outer diameter $D_2$ of its lower, smaller outer-diameter tube 21. Furthermore, in the drawing the numeral 22 stands for an inlet conduit and the numeral 23 for a discharge conduit.

In the embodiment shown in FIG. 1, the fluid ($W_1$) from the inlet conduit 22 flows through the flow holes 8 and concave voids 7 of the orifice plate 6 into the valve casing 1 and leaves through outlet passage 16. In this case, between the pressure ($P_1$) on the upstream side of the orifice plate 6 and the pressure ($F_2$) on its downstream side a pressure differential ($P_1 - P_2$) exists, while in the valve casing 1 the fluid ($W_2$) which has been filtered through the filtering medium 10 covering the ports 9 flows into the valve cylinder 5 and fills up the bonnet 12 and the cylindrical valve plug 4. At this time, the load (F) placed on the spring 11 which is compressed between the internal flange 20 of the valve cylinder 5 and the transverse surface of section 18 can be determined from the equation $$F = (P_1 - P_2) \times A \ldots \quad (1)$$

where A is the area of the pressure-receiving surfaces of the orifice plate 6. Since the valve plug 4 and the valve cylinder 5 are situated in the region of flow pressure ($P_2$), all the flow pressures of $P_2$ compensate one another. Furthermore, since $D_1 = D_2$ as described previously, the flow pressures ($P_3$) applied to the smaller outer-diameter tube 21 similarly compensate one another and cancel out. In other words, since the two axially projected pressure-receiving areas of the oblique shoulders (d+e) at the lower part and the oblique shoulder (f) at the upper part inside the smaller outer-diameter tube 21 are equal to each other when the valve plug 4 moves downwards under the differential pressure $P_1 - P_2$, all the flow pressures of $P_3$ compensate one another and thereby cancel out. Therefore the pressure differential ($P_2 - P_3$) has no effect, but the pressure differential ($P_1 - P_2$) alone has an effect on the cylindrical valve plug 4. Since the space of the intermediate flow passage 24 is regulated by the above-described conditions, the equation (1) always holds.

The rate of flow (Q) of the fluid flowing in the valve casing 1 can be determined from the equation $$Q = a_1 \times K \sqrt{2 \times g \times \frac{F}{\gamma A}}$$

where
$a_1$ = sum of all the areas of the passages formed from the flow holes 8 and the concave voids 7 through the orifice plate 6.
$\gamma$ = specific gravity of the fluid.
$g$ = acceleration of gravity.
$F$ = load applied on the spring 11.
$K$ = coefficient of flow rate.
From this equation the rate of flow (Q) is constant unless $a_1$ and A are varied.

As described above, the control valve of the present invention has the advantage in that the rate of flow can be controlled so as to always be held constant by that sliding action of the valve plug which adjusts the load due to the flow-pressure differential across the orifice plate 6 by the elastic force caused by elastic deformation, and results in accurate operation, almost troublefree operation, etc., the fluid entering the valve cylinder and valve plug having been purified through the filtering medium before flowing into the inner valve or slide member, which prevents the introduction of dust and dregs from the inlet conduit.

Figure 2:
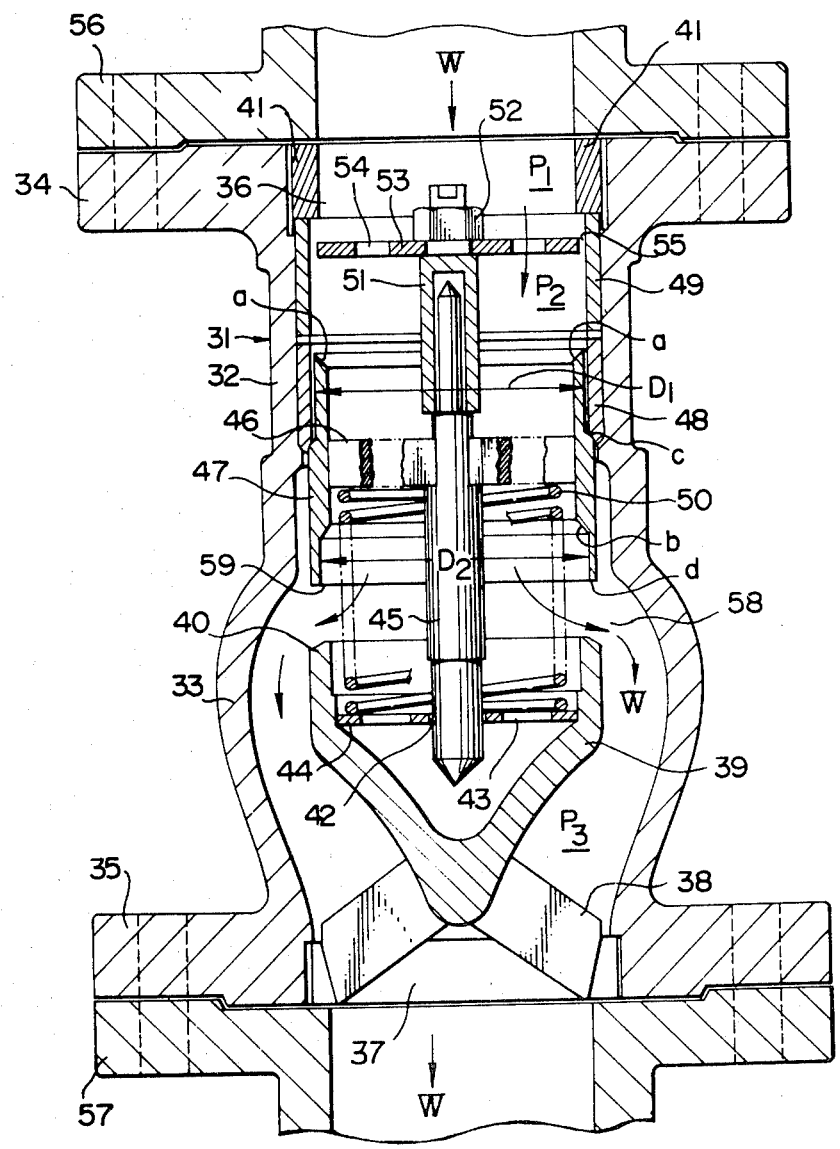
FIG. 2 is a vertical cross sectional view of a flow control valve having a modified construction, but also embodying the features of the invention.

Referring to FIG. 2 there is shown a valve casing 31 having flanges 34 and 35 at its opposite ends and integrally formed from the almost upper-half tube section 32 and the lower half bulging body 33. The upper and lower ends of the valve casing 31 respectively are provided with an inlet passage 36 formed from a tube member 41 and an outlet passage 37. A bowl-shaped guide element 39 of V-shaped cross section having its axis common to the valve casing 31 is rigidly fixed to spider 38 secured to the inside wall of said outlet passage 37. The annular upper edge of the guide element 39 forms a valve seat 40 comprising one peripheral surface at an intermediate flow passage 58. A transverse supporting plate 44 in which a central hole 42 and holes 43 are made is mounted in the guide element 39. The central hole 42 serves as a bearing and the lower part of a vertical stem member 45 is inserted in the central hole 42 at its center so as to slide therewithin.

To the stem 45 is fitted a crosspiece 46, which is in turn secured on the internal surface of a cylindrical valve plug 47. The peripheral surface of said valve plug 47 is dimensioned, so as to slide freely, on the internal surface of 9 guide bushing 48 held on the internal surface of the tube section 32 of the valve casing 31. A lining 49 is inserted in the tube section 32 at its upper internal surface and the upper end of this lining is in contact with the lower end of the tube member 41 engaged with threads on the internal surface of the flange 34. The outer diameter $D_1$ on the upstream side of said valve plug 47 is equalized to the inner diameter $D_2$ on the downstream side of the middle and lower parts of the valve plug 47 of which the outer diameter is made larger. The annular lower end 59 of the valve plug 47 is opposed to the seat 40 and defines the other peripheral surface forming with edge 40 the intermediate flow passage 58 for fluids passing through the valve. A coil spring 50 is positioned between said plate 44 and crosspiece 46. On the top of said stem 45, there is loosely positioned a tube 51 so as to slide freely and to which a circular orifice plate 53 having flow holes 54 is fixed by a nut. There is a clearance 55 between the outer periphery of the orifice plate 53 and the internal surface of the lining 49. Furthermore, in the drawing the numeral 56 stands for an inlet conduit, and the numeral 57 for an outlet conduit.

Next, the action of the valve of this embodiment is described. When the fluid (W) from the inlet conduit 56 flows into the inlet passage 36 in the direction of the arrow head, then the fluid flows through the flow holes 54 made in the orifice plate 53 and through the clearance 55 into the valve casing 31, generating a fluid pressure differential $(P_1-P_2)$ across said orifice plate 53. At this time, the load (F) placed on the spring 50 can be determined from the equation $$F=(P_1-P_2)\times A \ldots \qquad (1)$$

where A is the area of the pressure-receiving surfaces of the orifice plate 53. In FIG. 2, since $D_1=D_2$, the two flow pressures of $P_2$ placed on the axially projected, pressure-receiving areas of the surfaces (a) and (b) of the cylindrical valve plug 47 compensate each other and cancel out. Since the two pressure-receiving surfaces (c) and (d) of the shoulder and annular lower end 59 of the valve plug 47 are also designed to be exactly the same as each other in axially projected, pressure-receiving area, the two flow pressures of $P_3$ exerted on the pressure-receiving surfaces (c) and (d) in the bulging body 33 compensate each other and also cancel out. Consequently the pressure differential $(P_2-P_3)$ has no effect, but the pressure differential $(P_1-P_2)$ alone has an effect on the valve plug 47. Since the space of the intermediate flow passage 58 between the valve plug 47 and the valve seat 40 is regulated by the above-described conditions, the equation (1) always holds.

The rate of flow (Q) of the fluid flowing in the valve casing 31 can be determined from the equation $$Q = a_1 \times K \sqrt{2 \times g \times \frac{F}{\gamma A}} \qquad (2)$$

where
$a_1$ = sum of all the areas of the passages formed from the flow holes 54 through the orifice plate 53 and the clearance 55.
$\gamma$ = specific gravity of the fluid.
g = acceleration due to gravity.
F = load placed on the spring 50.
K = coefficient of flow rate.

From this equation the rate of flow (Q) is constant unless $a_1$ and A are varied.

Since the valve of the present invention is constituted as described above, it is able to maintain a substantially constant rate of flow by a simple mechanism, etc.

What I claim is:

1. A constant-flow fluid regulating valve comprising in combination:
   a valve casing having inlet and outlet ports at spaced locations therein;
   spring means mounted coaxially within said valve casing between said inlet and outlet ports;
   a slide member positioned coaxially within said valve casing normally biased by said spring means towards said inlet port, the lower extremity of said slide member defining a first peripherally extending edge of an intermediate flow passage for fluids upstream of said outlet port, said slide member comprising a cylindrical valve plug, a guide bushing being provided within one end of said valve casing and at least an axially extending portion of said valve plug being positioned concentrically within said guide bushing to slide therewithin, said valve plug having a transversely extending crosspiece secured fixedly therewithin, and the lower circumferentially extending edge of said valve plug comprising said first peripheral edge of said intermediate flow passage;
   an orifice plate carried by said slide member for movement therewith within said valve casing and having at least one aperture therein for the flow of fluid therethrough from said inlet port; and
   a guide member mounted fixedly and coaxially within said valve casing downstream of said slide member having a surface defining a second peripherally extending edge axially spaced from said first edge and defining therewith said intermediate flow passage, said guide member including a centering and support element fixedly mounted concentrically in said outlet port, a generally bowl-shaped guide element extending upwardly from said centering and support element and terminating in a circumferentially extending edge comprising said second peripheral surface of said intermediate flow passage, a transverse support plate being positioned within said guide element presenting a seat for one end of said spring means, the other end of said spring means bearing against said crosspiece;

whereby the force of said spring means tends to counterbalance fluid pressure differentials acting on the opposed faces of said orifice plate to thereby maintain the cross-sectional area of said intermediate flow passage and the rate of flow of fluid therethrough at a substantially constant value.

2. A fluid regulating valve according to claim 1, wherein an axially extending stem member is secured fixedly to said crosspiece so as to extend therethrough on both sides thereof, one end of said stem member being adapted to slide through a central aperture in said transverse support plate and said orifice plate being securable to the other end of said stem member.

3. A fluid regulating valve according to claim 2, wherein a lining is provided on the interior surface of said valve casing immediately upstream of said guide bushing and said orifice plate is dimensioned to slide within the confines of said lining with radial clearnace therebetween.

* * * * *